United States Patent
Francini et al.

(10) Patent No.: US 6,532,011 B1
(45) Date of Patent: Mar. 11, 2003

(54) METHOD OF CREATING 3-D FACIAL MODELS STARTING FROM FACE IMAGES

(75) Inventors: Gianluca Francini, Turin (IT); Mauro Quaglia, Montalenghe (Turin) (IT)

(73) Assignee: Telecom Italia Lab S.p.A., Turin (IT)

( * ) Notice: Subject to any disclaimer, the term of this patent is extended or adjusted under 35 U.S.C. 154(b) by 0 days.

(21) Appl. No.: 09/409,032

(22) Filed: Sep. 29, 1999

(30) Foreign Application Priority Data

Oct. 2, 1998 (IT) ......................................... TO98A0828

(51) Int. Cl.[7] ............................................... G06T 17/00
(52) U.S. Cl. ....................... 345/420; 345/441; 345/427; 345/473; 382/118
(58) Field of Search ................................. 345/441, 420, 345/473, 427, 419; 382/118

(56) References Cited

U.S. PATENT DOCUMENTS 5,995,639 A * 11/1999 Kado et al.
6,031,539 A * 2/2000 Kang et al.
6,154,222 A * 11/2000 Haratsch et al.

* cited by examiner

*Primary Examiner*—Mark Zimmerman
*Assistant Examiner*—Kimbinh T. Nguyen
(74) *Attorney, Agent, or Firm*—Herbert Dubno (57) ABSTRACT

The method allows the creation of 3-D facial models, which can be used, for instance, for the avatar implementation, video-communication applications, video games, video productions, and for the creation of advanced man-machine interfaces. At least one image of a human face is provided together with a 3D facial model (M) having a vertex structure and comprising a number of surfaces chosen within the set formed by a face surface (V), surfaces of the right eye (OD) and left eye (OS), respectively, and surfaces of the upper teeth (DS) and lower teeth (DI), respectively. Among the vertices of the structure of the model (M) and on such at least one face image, respective sets of homologous points are chosen. The model structure (M) is then modified in such a way that the above respective sets of homologous points are made to coincide (FIG. 2).

4 Claims, 10 Drawing Sheets

METHOD OF CREATING 3-D FACIAL MODELS STARTING FROM FACE IMAGES

FIELD OF THE INVENTION

Our present invention relates to a technique for the creation of 3-D facial models, which can be used for instance for the implementation of so-called avatars (anthropomorphological models) to be used in virtual environments, video-communication applications, video games, V productions, and creation of advanced man-machine interfaces.

BACKGROUND OF THE INVENTION

There are already some known technical solutions for the creation of a 3D model starting from the photograph of a person's face.

On this subject matter, reference can be made for instance to the product Character Creator of company Darwin 3D (see Internet site http://www.darwin3d.com) as well as to the product Avatar Maker of company Sven Technologies (see Internet site http://www.sven-tec.com). The product "Character Creator" is based on the choice of a basic model resembling the photographed person. The face of the photograph is framed by an ellipse and the program uses what lies within the ellipse as a texture of the model. In the product "Avatar Maker" a dozen of points are marked on the face, and a basic model is then chosen and to which the photograph texture is associated.

The main drawback of such known embodiments is that the structure of the generated model does not allow a subsequent animation. This is due to the fact that the model (usually generated as a "wire frame" model, i.e. starting from a mesh structure, as well also be seen in the sequel), cannot exactly fit the profile in the mouth region, thus preventing reproduction of lip movements. This also applies to other significant parts of the face, such as eyes and nose.

OBJECTS OF THE INVENTION

The object of the invention is to provide a method which allows the creation of facial models that can appear realistic both in static conditions and in animation conditions, in particular for instance as far as the opening and closing of eyelids and the possibility of simulating eye rotation are concerned.

According to the invention, this object is attained through a method of creating 3D facial models (M) starting from face images (I), which comprises the operations of:

providing at least one face image;

providing a 3-D model having a vertex structure and comprising a number of surfaces chosen within the group formed by: a face surface, right eye and left eye surfaces, upper teeth and lower teeth surfaces;

choosing respective sets of homologous points among the vertexes of the structure of the model and on the at least one face image, and modifying the structure of the model so as to make the respective sets of homologous points coincide.

According to the invention the eye surfaces and teeth surfaces (DS, DI) are chosen in such a way as not to interfere with the face surface. The vertices of the structure of the model of the respective set can be chosen in compliance with the MPEG-4 standard.

The modification of the structure of the model can include at least one of the operations chosen within the group formed by:

making the width of the projection of the model coincide with the width of the face image, vertically registering the projection of the model with the face image, and performing a global, nonlinear transformation of the model in the vertical direction in order to make the position of at least one characteristic feature of the model coincide with an homologous characteristic feature of such face image. The global transform can be performed through a second order function, preferably a parabolic function.

The modification of the structure of the model can include at least one of the following operations:

adaptation of the eyelid projection and of the eye contours in the model to the homologous regions in the face images through at least one operation chosen out of a translation and an affine transform, adaptation, in the vertical direction, of the nose through at least one operation chosen out of a scaling and a deformation through an affine transform, modification of the mouth through at least one affine transform, translation and scaling of the region between the nose base and the upper end of the mouth, and adaptation of the region between the lower end of the mouth and the chin tip by means of translation and scaling.

The method can include as the final operation of the modification of the model applying the eye surfaces and/or teeth surfaces close to the face surface.

The modification of the structure of the model can be carried out in the form of a geometric operation performed by positioning the face image and the model in opposite and mirroring positions with respect to the origin of a three-dimensional Cartesian system.

The method can additionally comprise the operation of applying a respective texture to the modified model. The method can comprise operations of computing at least one of the parameters chosen within the group including:

distance $\alpha$ between the origin and a center point of the model, and distance $\lambda$ between the origin and the plane of the image and of applying the texture to the modified model through a process of texture binding performed on the basis of at least one of the distance parameters.

Finally the method can comprise providing a plurality of the face images corresponding to different points of sight of the face, creating the texture to be applied to the model by generating, for each of the face images, a respective texture information in the form of right triangles of constant size, coupling two by two triangles relating to the texture information derived from a plurality of images so as to obtain, as a result of the coupling, respective rectangles, and applying the texture to the modified model in the form of a matrix of the rectangles.

Substantially the method according to the invention is based on the adaptation of a basic model of a face—typically a human face—having the physiognomy characteristics of the photographed person. The basic model (or template") is represented by a structure, preferably of the type called "wire frame", formed by a plurality of surfaces chosen out of a set of five surfaces, namely:

face, right eye and left eye, and upper teeth and lower teeth.

The eye surfaces are separated from those of the face so as to allow, among other things, creation of opening and closing movements of eyelids, and a slight translation simulating the actual eye rotation. Similarly, it is possible to perform the animation of the model, as far as the speech is concerned, through the animation of the surfaces representing the upper and lower teeth.

BRIEF DESCRIPTION OF THE DRAWING

The invention will now be described by way of a non-limiting example, with reference to the drawing attached hereto, in which.

SPECIFIC DESCRIPTION

Figure 1A:
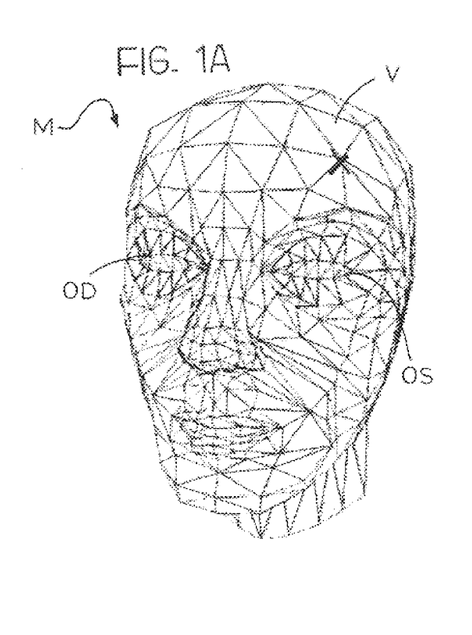
FIGS. 1A and 1B represent the typical look of the models used in the embodiment of the invention, represented in the wire frame mode (FIG. 2A) and in the solid mode (FIG. 2B), respectively.
Figure 1B:
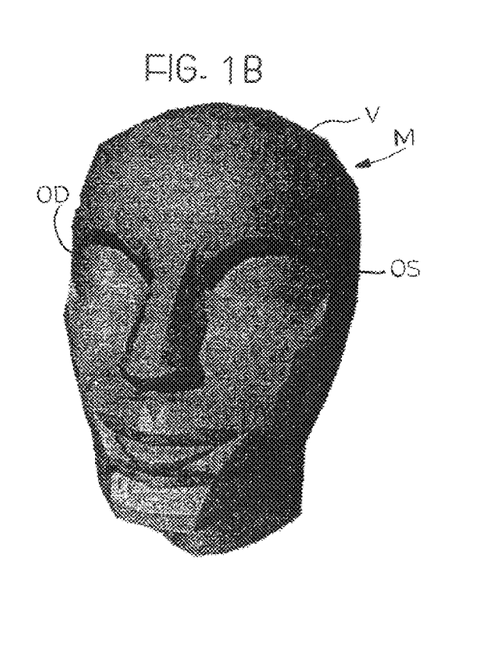
Figure 2A:
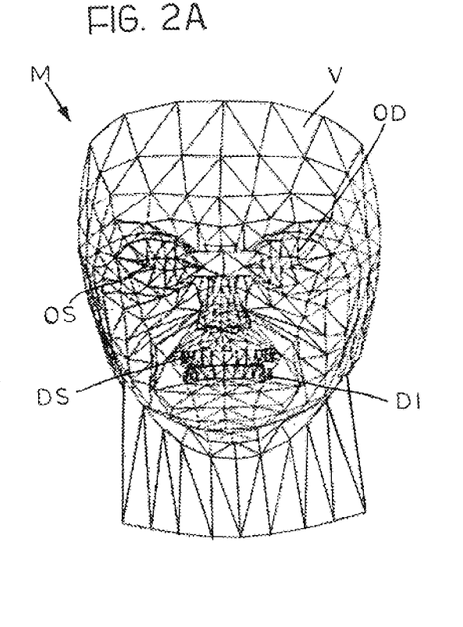
FIGS. 2A and 2B represent the same model as shown in FIGS. 1A and 1B in rear view, also in this case both in the wire frame mode (FIG. 2A) and in the solid mode (FIG. 2B)
Figure 2B:
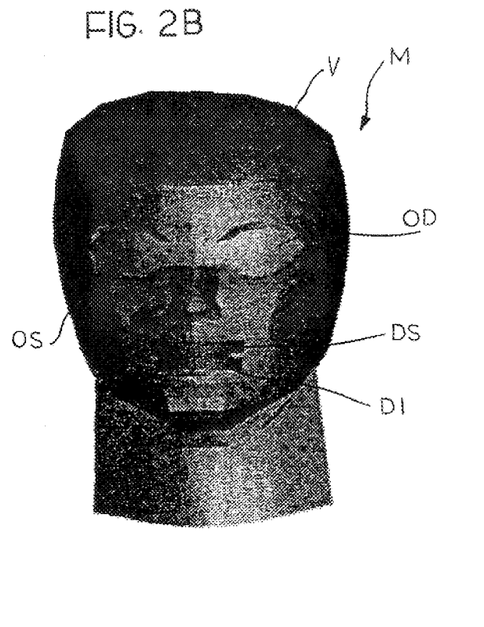
Figure 3A:
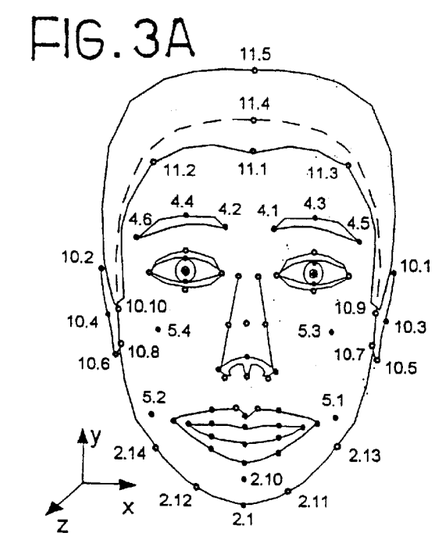
FIGS. 3A to 3I represent a set of tables which identify the feature points of a face according to the present state of the MPEG-4 standard, which face can be used for the embodiment of the invention.
Figure 3B:
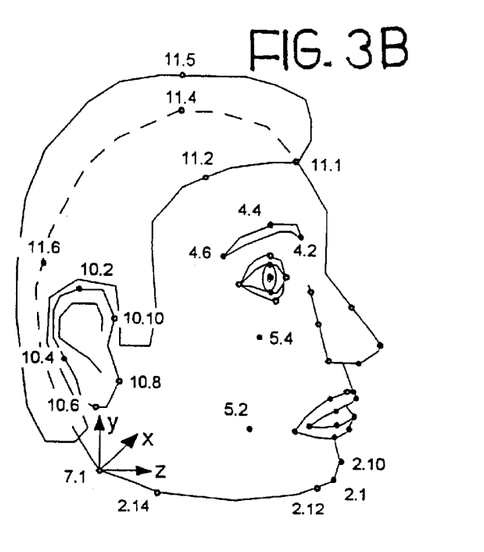
Figures 3C, 3D, 3E, 3F, 3G:
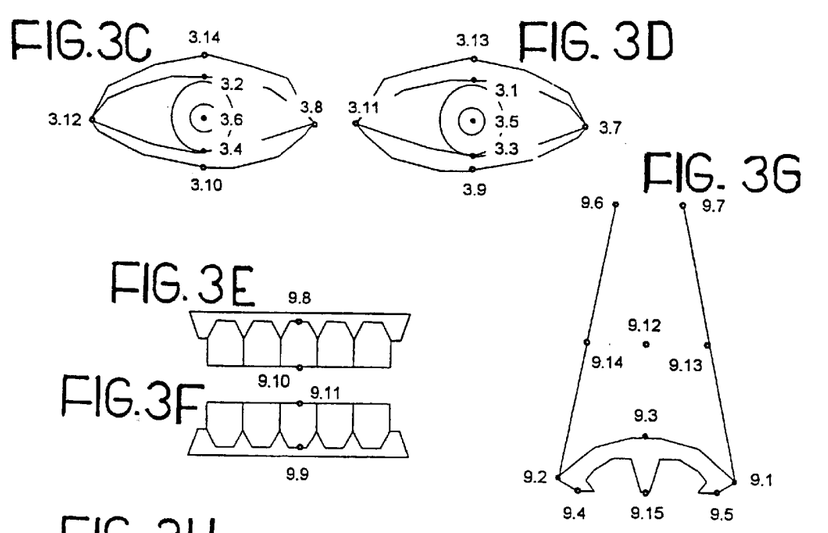
Figure 3H:
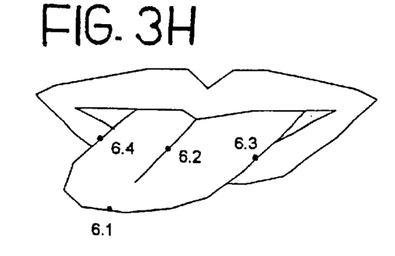
Figure 3I:
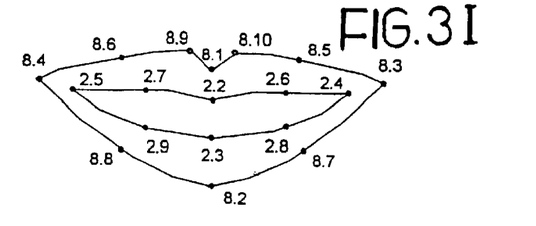

FIGS. 1 and 2 show a basic model M of human face, which can be used in a possible embodiment of the invention. Model M is here represented both in the wire frame mode and in the solid mode. The solid model differs from the wire frame model essentially by the background painting of the triangles of the wire frame. The model M here represented is formed by five surfaces, namely:

face V, formed—in the embodiment illustrated herein— by 360 vertices and 660 triangles,     right eye OD and left eye OS, each consisting of 26 vertices and 37 triangles,     upper teeth DS and lower teeth DI, each consisting of 70 vertices and 42 triangles.

It will be appreciated in particular that model M is a hollow structure, which may practically be assimilated to a sort of mask, the shape of which is designed to reproduce the features of the modelled face. Of course, though corresponding to an embodiment of the invention being preferred at present, the number of vertices and triangles to which reference has been previously made has a merely exemplary character and must in no case be regarded as a limitation of the scope of the invention.

These considerations also apply to the choice of using five different surfaces to implement the basic model. As a matter of fact, the number of such surfaces might be smaller (for the implementation of simpler models) or larger (for the implementation of more detailed and sophisticated models), depending on the application requirements. The important feature is the choice of using, as the basic model, a model comprising a plurality of surfaces and in particular surfaces that, depending on the type of face to be modelled (for instance a human face), correspond to shapes which are substantially known in general terms and have a relative arrangement, which as a whole, also is already known.

As a matter of fact, although the typology of the human face is practically infinite, it is known that the surface of the face has a general bowl-like look, that the eyelids have generally just a "eyelid" surface, which is at least marginally convex, that the dental arches have an arc shape, etc. It is then known that the eyelids are located in the medium-upper region of the face surface, whereas the teeth surfaces are located in the lower region.

Furthermore, the fact of using distinct surfaces for the creation of the model allows applying to the model separation conditions, as those which make it possible to avoid, for instance, the interference of the teeth surfaces, so as to accurately model the congruency effect of the dental arches.

The characteristic might be even better appreciated in the rear views of FIGS. 2A and 2B.

The method according to the invention is substantially based on the solution of:

taking an image (typically a front photograph) of the face to be modelled, and     modifying the model or template through a series of geometric transformations so that its projection coincides with a set of points identified on the photograph assumed as a starting image.

For this adaptation, use is made of respective sets of points which have been chosen in correspondence with as many so called "feature points": such points are defined in the section "Face and body animation" of the ISO/IEC standard 14496-2 (MPEG-4) and are represented in FIGS. 3A to 3H.

In particular, in an embodiment of the invention being preferred at present, the method according to the invention is implemented by using the feature points identified in the MPEG-4 standard (as defined at the filing date of this invention) by the following index: 11.4, 2.1, 10.9, 10.10, 8.4, 8.1, 8.3, 8.2, 2.2, 2.3, 9.3, 9.2, 9.1, 4.1, 3.12, 3.8, 3.10, 3.14, 3.11, 3.13, 3.7, and 3.9. Each of such indexes corresponds with a vertex of the model structure.

Figure 4:
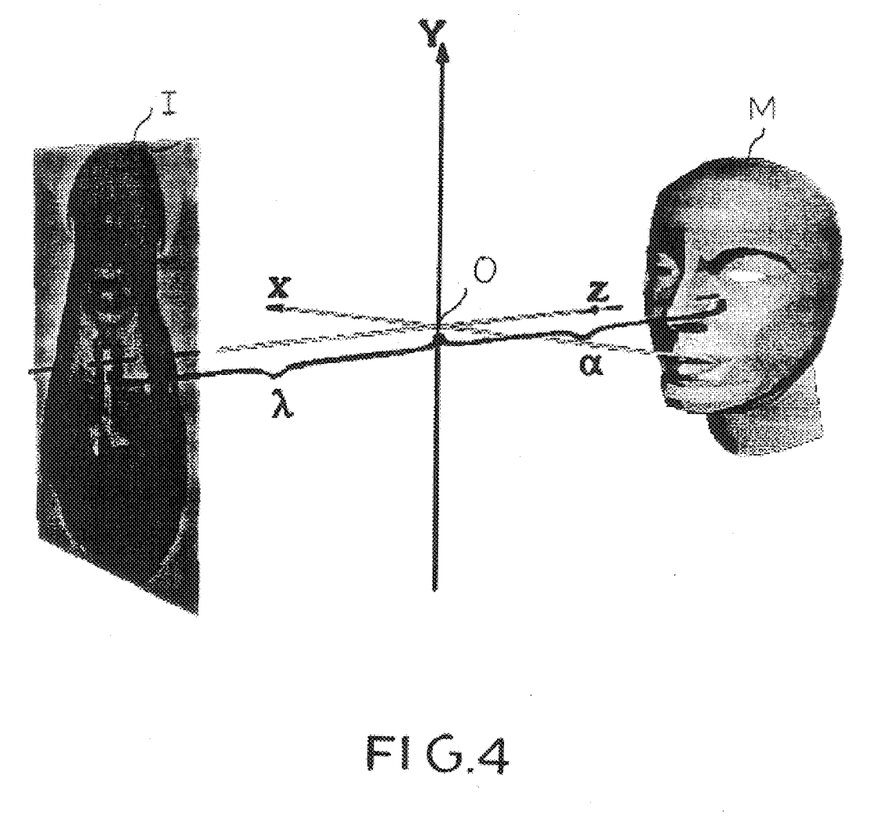
FIG. 4 schematically shows one of the phases of the method according to the invention.
Figure 8:
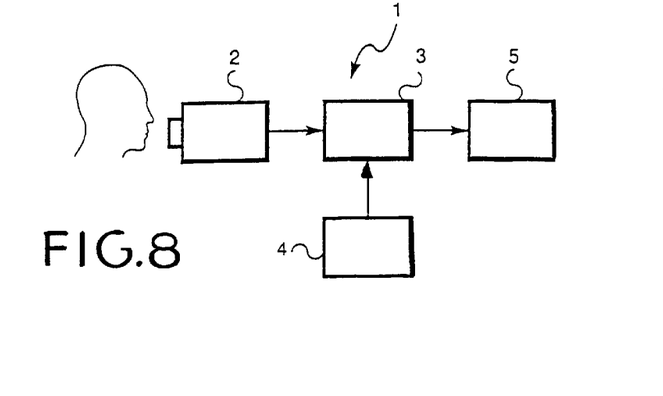
FIG. 8 depicts, in the form of a block diagram, the structure of a system which can be used for carrying out the invention.

FIG. 4 synthesizes the method according to the invention, so as this can be performed through the system shown in FIG. 8.

Figure 7A:
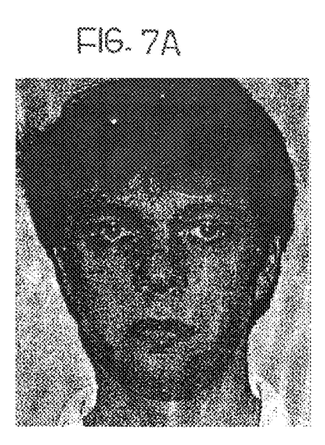
FIG. 7A is a photograph highlighting the feature points used for the calibration in a possible embodiment of the method according to the invention.
Figure 7B:
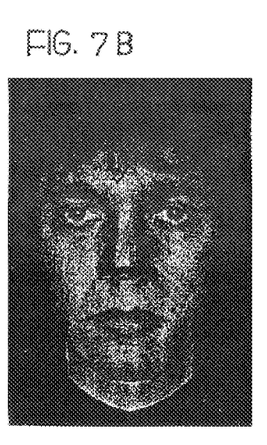
FIGS. 7B and 7C show two views of the resulting model complete with texture.
Figure 7C:
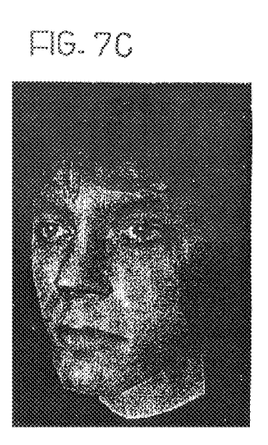

Such a system, denoted by 1 as a whole, includes a pick-up unit 2, for instance a digital camera or a functionally equivalent unit, such as a conventional camera capable of producing photographs which, after development and print, may be subjected to a scanning process. Starting from a subject L, unit 2 can therefore generate a plane image I of the face to be modelled: this image is in practice an image of the type shown in FIG. 7A.

The image I so obtained is in the form of a digitized image, i.e. if a sequence of data that represent pixel by pixel the information (brightness, chromatic characteristics, etc.) relating to the same image.

Such a sequence of data is provided to a processing system 3 (essentially a computer) which performs— according to principles well known to a specialist, once the criteria of the embodiment of the invention described in detail in the following have been set forth—the operations listed below:

identification and extraction of the feature points of the image I, designed to be used for processing model M, reading from a memory or a similar support 4, associated to the processor, of the data corresponding to the starting model, which data have been previously stored and are read also in this case according to well known modalities, execution of the processing operations typical of the method according to the invention, as better described in the sequel, and generation of the processed output model, also in this case in the form of digital data representative of the 3-D model; such data can be transferred to and loaded into another processing system (for instance an animation system) and/or downloaded into a storage support 5 (floppy disc, CD-ROM, etc.) for their subsequent use.

The operation of adaptation of the starting model M, previously described, to image I is based on a virtual optical projection of model M and image I, respectively, performed in a system the focus of which lies in the origin O of a three-dimensional Cartesian space x, y, z in which model M is placed in the positive half space along the Z axis and image I is placed in the negative half-space (see the diagram of FIG. 4).

It will be appreciated that the fine adaptation of model M to image I is based on the assumption that model M is on the whole oriented, with regard to the plane XY of the above-described system, in a generally mirror-like position with regard to image I. Hence, model M is placed with a front orientation, if one requires adaptation to a front image I. On the contrary model M will be for instance laterally oriented, if it is required to achieve adaptation to a side image of the head of the person represented in image I.

This also substantially applies to the distance $\alpha$ between origin O and the centre of model M and distance $\lambda$ between origin O and the plane of image I. To simplify the calibration process and avoid the introduction of unknown values by the user, at least distance $\alpha$ is set to an arbitrary value (for instance 170 cm), determined in advance by calculating the average of a set of possible cases. It must be still considered that value $\alpha$ depends not only on the distance of the subject from camera 2 at the time when image I was taken, but also on the parameters of the same camera.

Substantially, the method according to the invention consists of a series of geometrical transformations aimed at making the projection of the set of feature points of the model M of interest coincide with the homologous set of homologous points identified on image I.

Let then $(x_{i,j}, y_{i,j}, z_{i,j})$ be the space co-ordinates of the vertex of model M associated to feature point ij (for instance, the left end of the face) and $(X_{i,j}, Y_{i,j})$ be the co-ordinates in image I of the same feature point (referred to a local system on the plane of image I, with the origin coinciding with the upper angle of the image, in a possible embodiment).

After starting the process (step 100 in the flow chart of FIG. 9), the first operational step (101 in FIG. 9) is the computation of value $\lambda$.

Figure 9:
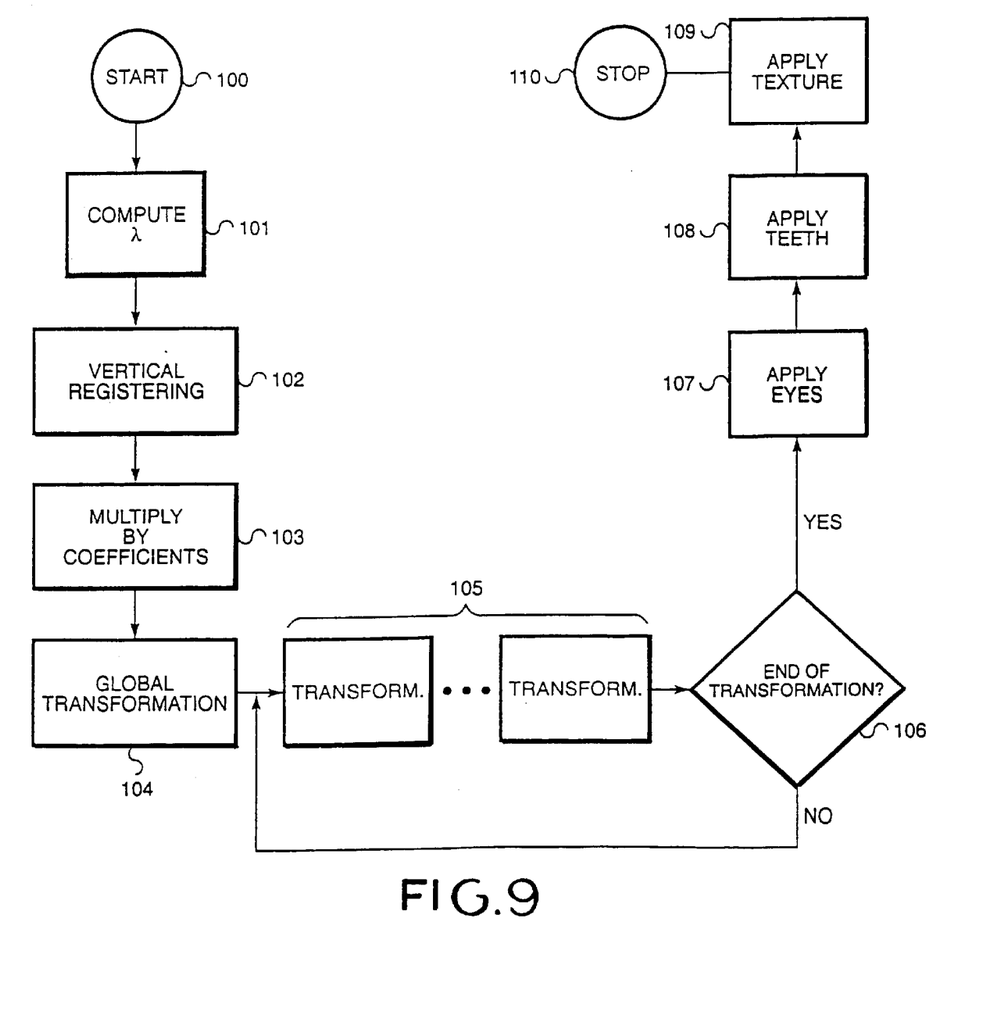
FIG. 9 is a flow chart concerning a possible embodiment of the method according to the invention.

Let $X_0$, $Y_0$ be the co-ordinates of the centre of the face taken in image I. These co-ordinates are obtained by exploiting the four points placed at the end of the face (for instance, with reference to the present release of MPEG-4 standard, points 10.9 and 10.10: right end and left end of the face, and 11.4, 2.1: top of head and tip of chin). The following relation will then apply:

$$X_0 = \frac{X_{10.9} + X_{10.10}}{2}; \qquad (I)$$

$$Y_0 = \frac{Y_{11.4} + Y_{2.1}}{2}$$

Distance $\lambda$ is computed in such a way as to make the width of the projection of the model coincide with the width of the face in the photograph, according to the following relation:

$$\lambda = \frac{X_{10.9} - X_0}{X_{10.9}} \qquad (II)$$

Subsequently (step 102) the position of model M along the Y axis is modified so that its projection is vertically in register with the contents of image I. A value $\Delta y$, computed according to relation:

$$\Delta y = -\frac{Z_{2.1}(Y_{11.4} - Y_{2.1})}{Z_{11.4} + Z_{2.1}} - Y_{2.1} \qquad (III)$$

is added to each vertex.

In this way the model is scaled vertically. After this operation, the size of its projection coincides with the area of the head reproduced in image I.

In a subsequent step 103, each co-ordinate Y of the vertices of model M is multiplied by a coefficient c computed as follows:

$$c = -\frac{Z_{2.1} \cdot (Y_{2.1} - Y_0)}{\lambda \cdot Y_{2.1}} \qquad (IV)$$

Figure 5:
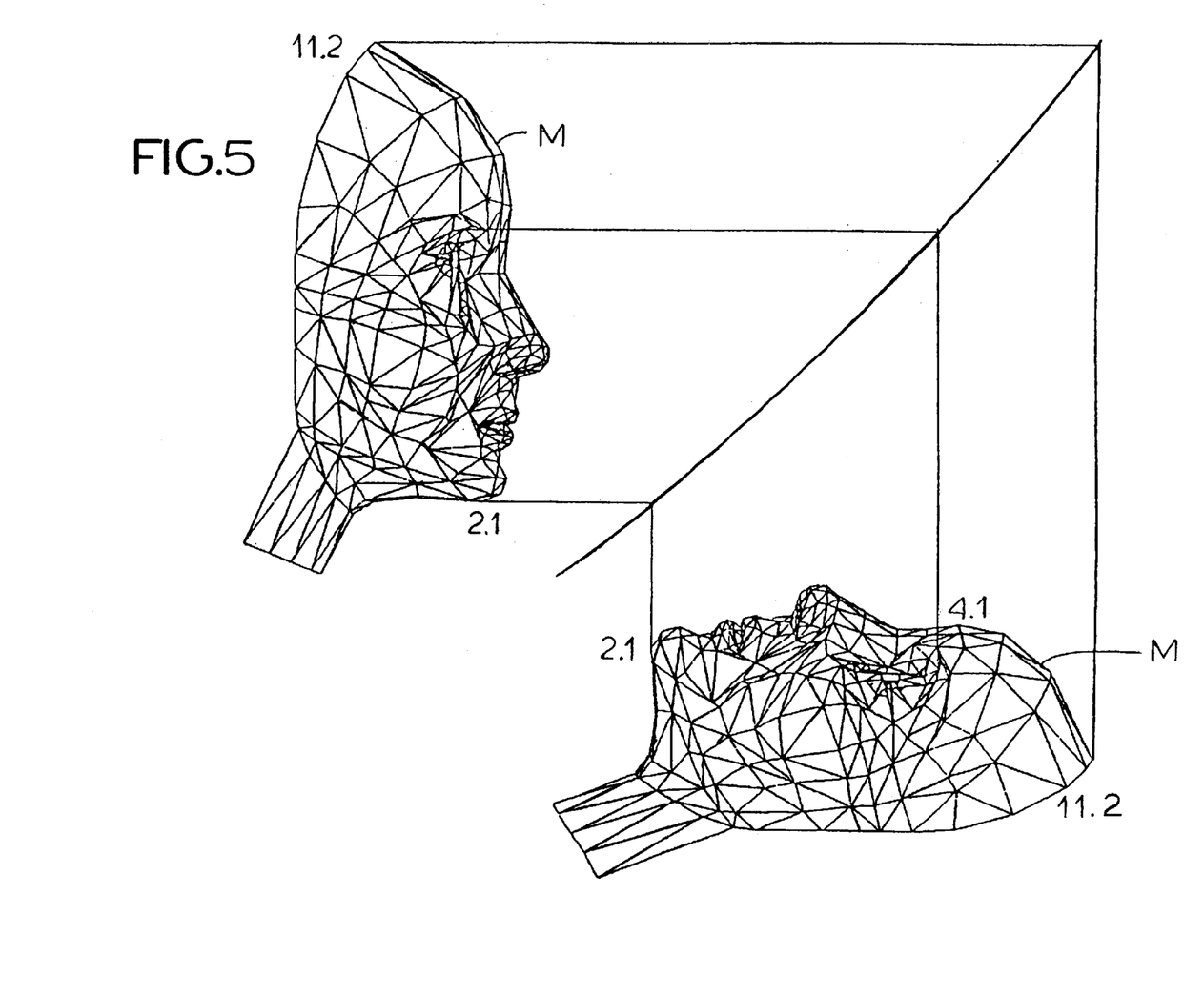
FIG. 5 schematically shows another phase of the method according to the invention.

At this point (step 104) a global transformation is performed in the vertical direction on the model in order to make the position of some characteristic features of the face (for instance, the eyebrows) coincide with those of the person. The model is substantially altered along the Y axis, as shown in FIG. 5.

Preferably, the global transformation is a non-linear transformation, preferably of second order, and most preferably it is based on a parabolic law, in particular of the type corresponding to a generic parabola ($y = az^2 + bz + c$) passing in the three points of the plane YZ:

$$\left( y_{11.4'} - \frac{(Y_{11.4} - Y_0) \cdot Z_{11.4}}{\lambda} \right)$$

$$\left( y_{4.1'} - \frac{(Y_{4.1} - Y_0) \cdot Z_{4.1}}{\lambda} \right)$$

$$\left( y_{2.1'} - \frac{(Y_{2.1} - Y_0) \cdot Z_{2.1}}{\lambda} \right)$$

In particular in FIG. 5, the model shown in a recumbent position, so in a horizontal direction, corresponds to the model before the transformation according to the parabolic function previously described, whereas the model shown in a vertical position is the result of said transformation.

Thereafter (step 105, with an essentially cyclic structure, defined by a choice step 106, that finds out whether the sequence can be considered as complete) a series of transformations (translations, scalings and affine transforms) designed to correctly position the individual features characteristic of the face is performed. Preferably the operations involved are the following:

the eyelids and the contour of the eyes are adapted by means of two translations and four affine transforms;

the nose is first vertically adapted through scaling and then deformed through two affine transforms;

the mouth is modified by applying four affine transforms;

the region between the nose basis and the upper end of the mouth is translated and scaled; and the region between the lower end of the mouth and the tip of the chin is translated and scaled.

Preferably the adopted affine transforms correspond to a transform that may be set out according to a relation of the type:

$$x'=c_1 x+c_2 y+c_3$$
$$y'=c_4 x+c_5 y+c_6$$

where:

$$c_1 = \frac{(x'_1 - x'_3)(y_1 - y_2) - (x'_1 - x'_2)(y_1 - y_3)}{(y_1 - y_2)(x_1 - x_3) - (y_1 - y_3)(x_1 - x_2)}$$

$$c_2 = \frac{(x'_1 - x'_2)(x_1 - x_3) - (x'_1 - x'_3)(x_1 - x_2)}{(y_1 - y_2)(x_1 - x_3) - (y_1 - y_3)(x_1 - x_2)}$$

$$c_3 = x'_1 - c_1 x_1 - c_2 y_1$$

$$c_4 = \frac{(y'_1 - y'_3)(y_1 - y_2) - (y'_1 - y'_2)(y_1 - y_3)}{(y_1 - y_2)(x_1 - x_3) - (y_1 - y_3)(x_1 - x_2)}$$

$$c_5 = \frac{(y'_1 - y'_2)(x_1 - x_3) - (y'_1 - y'_3)(x_1 - x_2)}{(y_1 - y_2)(x_1 - x_3) - (y_1 - y_3)(x_1 - x_2)}$$

$$c_6 = y'_1 - c_4 x_1 - c_5 y_1$$

The described formulas express a planar transformation driven by the displacement of three points:

$(x_1, y_1), (x_2, y_2), (x_3, y_3)$ are the co-ordinates of such points before the transformation, $(x_1', y_1'), (x_2', y_2'), (x_3', y_3')$ are the corresponding coordinates after the transformation.

As the last operations concerning the geometry of the model, two wire frames representing the eyes (sclera and iris) are positioned behind the eyelids, so as to allow their closing and to leave sufficient room for a displacement simulating the movements of the eyes (step 107). Standard teeth which do not interfere with the movements of the mouth (108) are then added to the model.

Figure 6A:
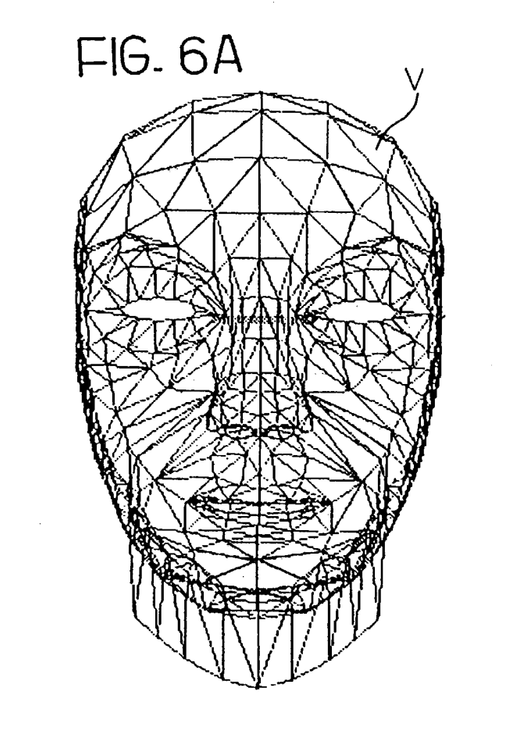
FIGS. 6A, 6B and 6C respectively show the evolution of the model within a method according to the invention.
Figure 6B:
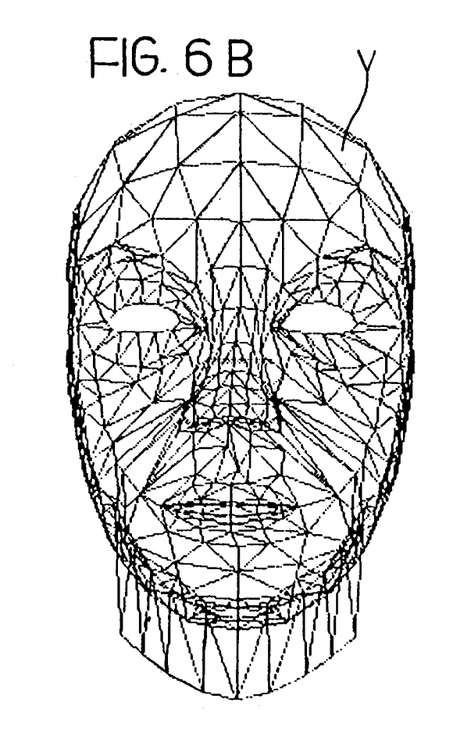
Figure 6C:
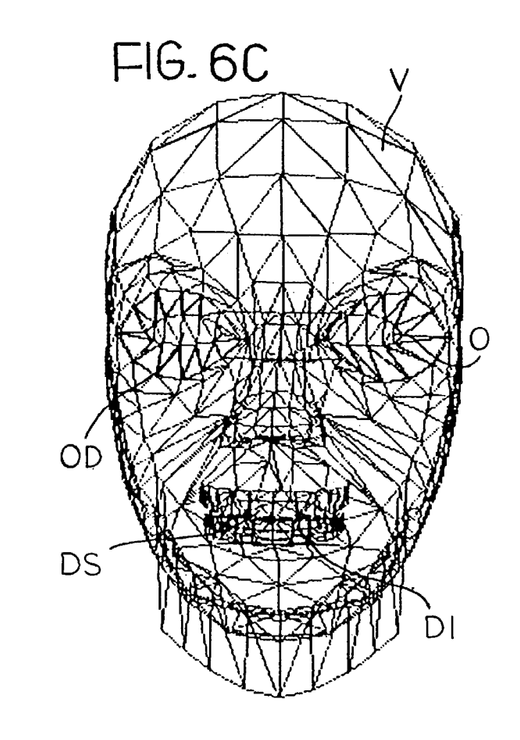

The sequence shown in FIGS. 6A–6C represents the evolution of model M (here represented according to the wire frame mode, to better highlight the variations) with reference to the front appearance of the basic model (FIG. 6A), after the affine transforms (FIG. 6B) and after completion with eyes and teeth (FIG. 6C).

At this point the application of the texture to the model is performed (step 109) by associating to each vertex a bi-dimensional co-ordinate that binds it to a specific point of image I, according to a process known as "texture binding". The data relating to the texture binding are computed by simply exploiting projections parameters α and λ, defined at the start of the calibration described at the beginning of this description. Teeth have a standard texture, defined in advance.

In the case in which the model is created starting from several images, a further step is performed concerning the generation of the texture. Such step however is not specifically represented in the flow chart of FIG. 9. As a matter of fact, the image containing the model texture is created by joining the information associated to the various points of sight.

Preferably, in order to better exploit the resolution of the image designed to contain the texture, the shape of the texture of all the triangles of the model is transformed into a right triangle of a constant size. The triangles so obtained are then coupled two by two in order to obtain a rectangular shape. The rectangles are then placed into the image according to a matrix arrangement so as to cover its surface. The size of the rectangles is a function of the number of triangles of the model and of the size of the image that stores the texture of the model.

Figure 10:
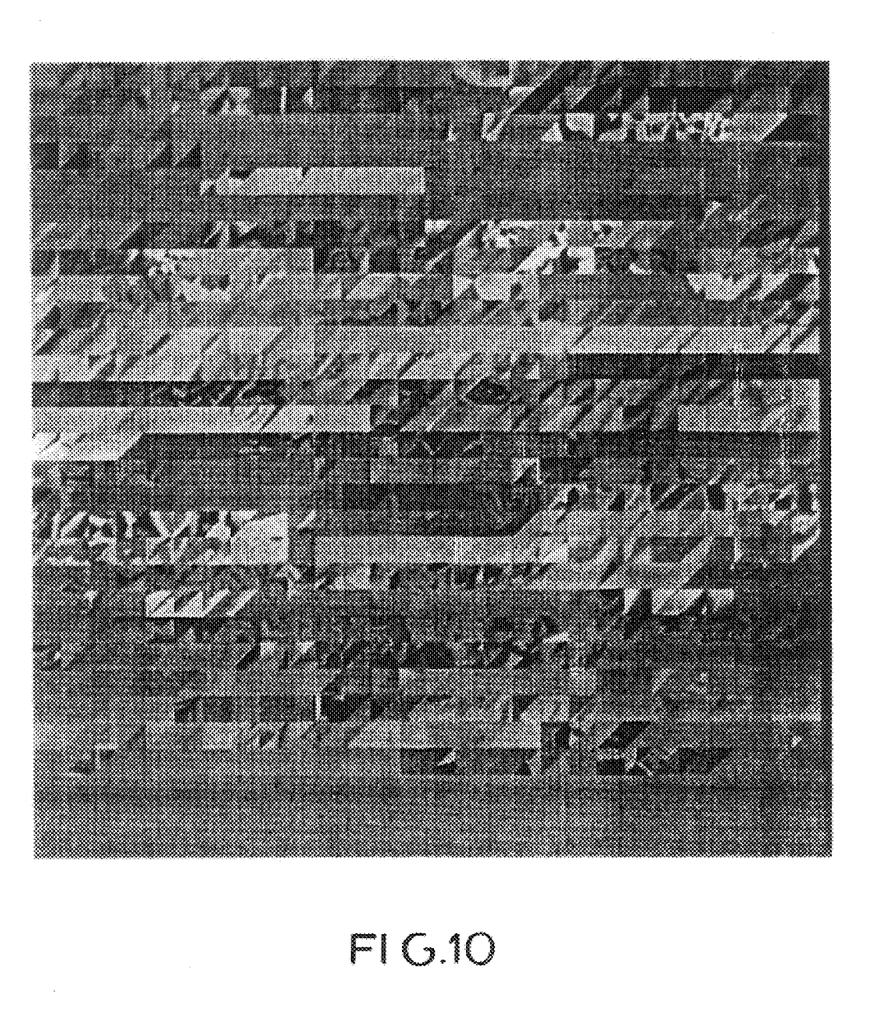
FIGS. 10 and 11 are diagrams which exemplify the application of a so-called texture within the present invention.

FIG. 10 shows an example of image containing the texture of the various triangles. Each rectangle (the polygons shown are not squares, and are formed by N×N+1 pixels) contains the texture of two triangles. At the beginning the texture of the individual triangles has a generic triangle shape that has been transformed into a right triangle by means of an affine transform and a bi-linear filtering.

Figure 11:
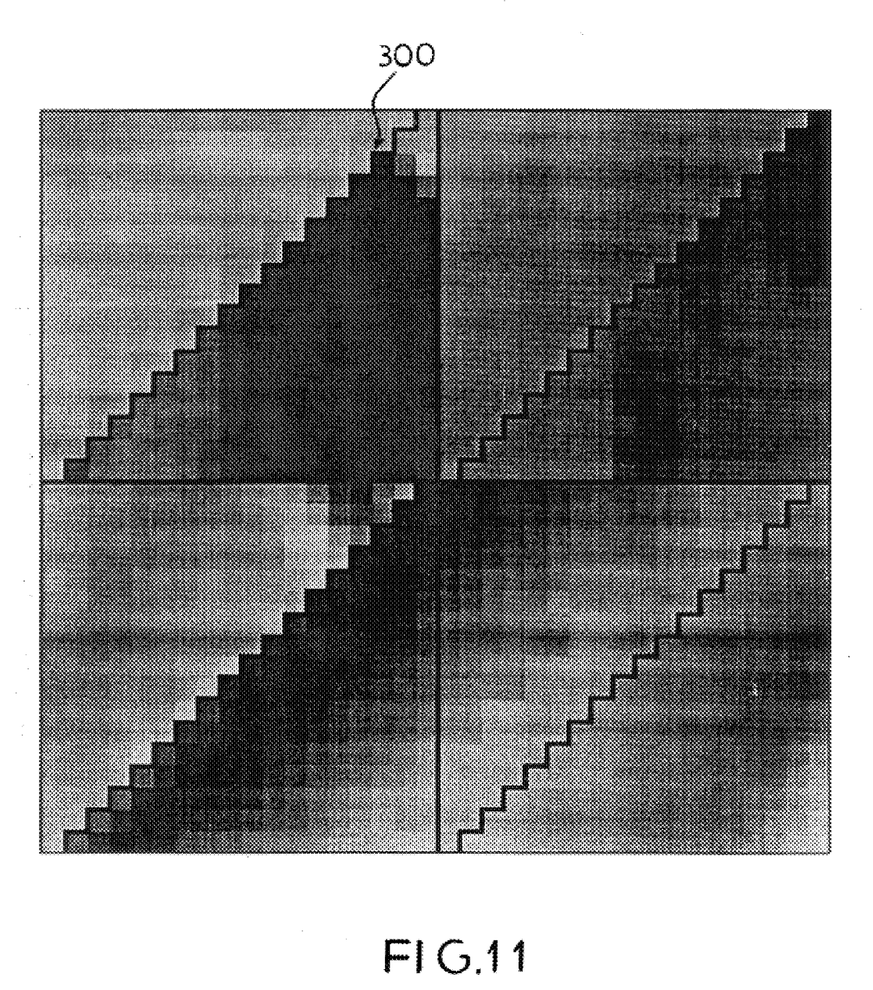

FIG. 11 illustrates a detail of the previous FIG. 10, showing the actual area of the texture used by two triangles inside the rectangle (areas defined by lines 300. For each rectangle of size N×N+1, the effective area is N×N pixels.

It is worth noting that this process for texture generation is not specific for the models of human face, but can be applied in all the cases of creation of a 3-D model starting from several images.

The model obtained in this way may be then represented by using different common graphic formats (among which, in addition to the MPEG-4 standard previously cited, the standards VRML 2.0 and OpenInventor). All the models can be animated so as to reproduce the lip movements and the countenances. In the case in which several images of the person, taken from different points of sight, are available, it is possible to apply the method described to the different images so as to enhance the look of the model. The resulting model is obviously oriented according to the orientation of the image.

It is evident that, while keeping unchanged the invention principles set forth herein, the details of implementation and the embodiments can be varied considerably with regard to what has been described and illustrated, without departing from the scope of this invention, as will be defined in the following claims.

What is claimed is:

1. A method of creating 3D facial models (M) starting from face images (I), which comprises the steps of:
   (a) providing at least one face image (I);
   (b) providing a 3-D facial model (M) having a vertex structure and comprising a number of surfaces chosen within the group formed by: a face surface (V), a right eye and left eye (OD, OS) surface upper teeth and lower teeth (DS, DL) surface,
   (c) choosing respective sets of homologous points among the vertices of the structure of said model (M) and on said at least one face image (I); and
   (d) modifying the structure of said model (M) so as to make the respective sets of homologous points coincide, the modification of the structure of said model (M) including at least one of the operations chosen within the group formed by:
   ($d_1$) making the width of the projection of the model (M) coincide with the width of said face image (I),
   ($d_2$) vertically registering the projection of the model (M) with said face image (I), and
   ($d_3$) performing a global, nonlinear transformation of the model (M) in the vertical direction in order to make the position of at least one characteristic feature of the model (M) coincide with an homologous characteristic feature of such face image (I), said modification of the structure of the model (M) being carried out in the form of a geometric operation performed by positioning said face image (I) and said model (M) in opposite and mirroring positions with respect to the origin (O) of a three-dimensional Cartesian system (X, Y, Z).

2. The method according to claim 1 which further comprises the step of applying a respective texture to said modified model.

3. The method according to claim 2 which includes the steps of:

provi­ding a plurality of said face images (I) corresponding to different points of sight of said face, creating the texture to be applied to said model (M) by generating, for each of said face images, a respective texture information in the form of right triangles of constant size, coupling two by two triangles relating to the texture information derived from a plurality of images so as to obtain, as a result of the coupling, respective rectangles, and applying said texture to said modified model in the form of a matrix of said rectangles.

4. The method according to claim 1 which includes the steps of computing at least one of the parameters chosen within the group including:

distance $\alpha$ between said origin (O) and a center point of said model (M), and distance $\lambda$ between said origin (O) and a the plane of said face image (Y) and of applying said texture to said modified model (M) through a process of texture binding performed on the basis of at least one of said distance parameters.

* * * * *